United States Patent
Ried et al.

(10) Patent No.: US 12,178,216 B2
(45) Date of Patent: Dec. 31, 2024

(54) FILLING AND PORTIONING SYSTEM FOR FOOD PRODUCTS AND METHOD FOR ROTATIONAL SPEED CONTROL OF AN ASSOCIATED FEEDER/MIXING ARM AND/OR COUNTERHOLDING DEVICE

(71) Applicant: Albert Handtmann Maschinenfabrik GmbH & Co. KG, Biberach (DE)

(72) Inventors: Martin Ried, Ehingen-Sontheim (DE); Martin Widmann, Ravensburg (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 231 days.

(21) Appl. No.: 17/817,809

(22) Filed: Aug. 5, 2022

(65) Prior Publication Data
US 2023/0040997 A1   Feb. 9, 2023

(30) Foreign Application Priority Data
Aug. 6, 2021 (EP) .................................... 21190127

(51) Int. Cl.
A22C 11/00 (2006.01)
A22C 11/02 (2006.01)
A22C 11/08 (2006.01)

(52) U.S. Cl.
CPC .......... *A22C 11/0263* (2013.01); *A22C 11/08* (2013.01)

(58) Field of Classification Search
CPC ........... A22C 11/0263; A22C 11/11–02; A22C 11/08; A22C 5/00; B65B 1/48; B65B 39/007; B65B 1/16
USPC .................................................... 452/30, 31
See application file for complete search history.

(56) References Cited

U.S. PATENT DOCUMENTS

| | | | |
|---|---|---|---|
| 7,597,612 B2 * | 10/2009 | Maile | F16K 1/36 452/30 |
| 10,562,037 B2 | 2/2020 | Bauer et al. | |
| 2017/0088295 A1 * | 3/2017 | Staudenrausch | B65B 1/16 |

FOREIGN PATENT DOCUMENTS

DE   102016216851 A1   3/2018

OTHER PUBLICATIONS

"European Norm EN 12463:2004 for Food manufacturing equipment, Filling machines (food), Meat, Equipment safety, Safety measures, Hazards, Occupational safety, Hygiene, Verification," European Standard 12463:2004, Available as Early as Jan. 2011, 18 pages. (Submitted with Partial Machine Translation).

* cited by examiner

Primary Examiner — Richard T Price, Jr.
(74) Attorney, Agent, or Firm — McCoy Russell LLP

(57) ABSTRACT

A filling and portioning system for food products and a method for rotational speed control of a feeder and/or mixing arm and/or counterholding device present thereon for conveying the food product in a filling hopper are described. According thereto, the feeder/mixing arm in the filling hopper can be rotated about itself by way of a motor for conveying the food product and is driven independently of a downstream conveyor mechanism. The counterholding device is also arranged in the filling hopper and can optionally be rotated about itself by way of a motor for conveying the food product and is driven independently of a downstream conveyor mechanism. The rotational speed of at least one of the motors is controlled in an automated manner in dependence of at least one machine or product parameter measured during operation of the filling and portioning system.

19 Claims, 1 Drawing Sheet

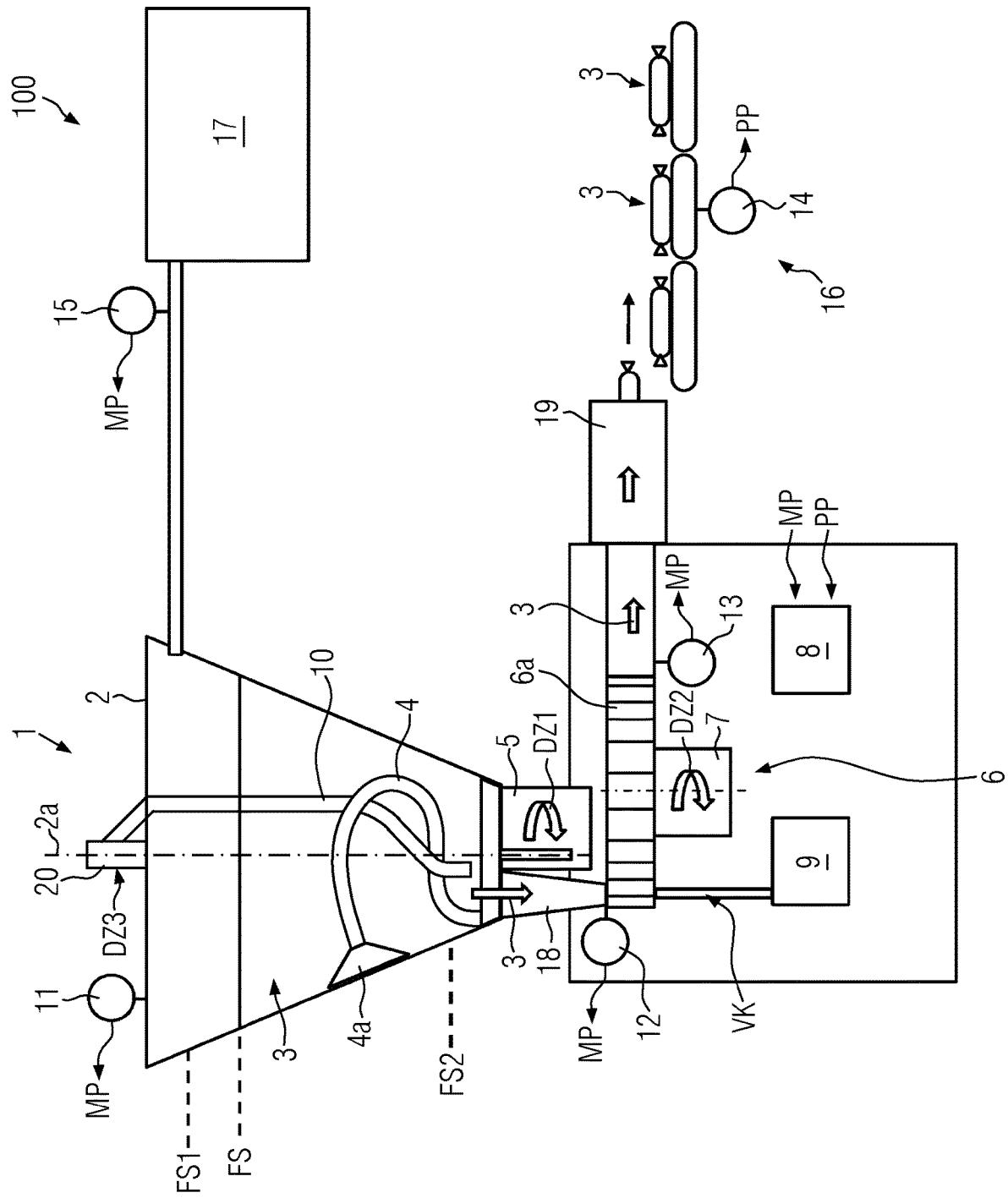

FILLING AND PORTIONING SYSTEM FOR FOOD PRODUCTS AND METHOD FOR ROTATIONAL SPEED CONTROL OF AN ASSOCIATED FEEDER/MIXING ARM AND/OR COUNTERHOLDING DEVICE

CROSS-REFERENCE TO RELATED APPLICATION

The present application claims priority to European Patent Application No. 21190127.7 filed on Aug. 6, 2021. The entire contents of the above-listed application are hereby incorporated by reference for all purposes.

TECHNICAL FIELD

The disclosure relates to a filling and portioning system for food products and to a method for rotational speed control of a feeder and/or mixing arm and/or counterholding device.

BACKGROUND

A generic filling and portioning system for food products, such as raw sausage, dough, or soup, is known, for example, from EP 1 892 451 B1. Such systems are typically based on vacuum filling machines which, as is known, comprise a filling hopper, a feeder and/or mixing arm rotatable therein by a motor, a stationary or driven counterholding device in the form of a counterholding arm or auger, and a vacuum-assisted conveyor mechanism with which the food product is supplied to an attachment device for portioning, for example, a filling grinder. The filling and portioning system can comprise further components such as a loading unit on the inlet side for the food product and/or its components and a weighing system on the outlet side for individual portioned food products.

Furthermore, it is known in principle to drive the conveyor mechanism, the feeder/mixing arm, and the optionally driven counterholding device at a rotational speed ratio that can be set by the operator or even independently of one another. In the case of liquid products with chunky components such as soups and stews, this is intended to prevent the different ingredients from separating. Likewise, the feeder/mixing arm can be run twice as fast as the conveyor mechanism, for example, when blocks of butter are filled in to knead them to become pasty.

However, it has been found that such or even higher rotational speed ratios can lead to permanent overloading of the drive components and often only inadequately cope with the ongoing processing procedure. For example, the consistency of the food products can change so much during their processing in the filling hopper that the rotational speed ratio selected by the operator is temporarily too high and/or too low to obtain equally gentle processing of the food product and sufficiently uniform filling of the downstream conveyor mechanism.

The filling level of the food product in the filling hopper can also interact unfavorably with the selected rotational speed of the feeder/mixing arm and the counterholding device. For example, product can be ejected at maximum filling level because the feeder arm rotates too fast in the filling hopper. On the other hand, when the filling hopper is almost empty, a higher rotational speed of the feeder/mixing arm can be necessary in order not to have the vacuum interrupt at the conveyor mechanism and to fill its chambers completely with the food product, even towards the end of the production process.

In addition, certain food products, such as dough, can be mechanically overloaded by a feeder arm rotating too fast. It would then be desirable to minimize the rotational speed of the feeder/mixing arm when the filling hopper is filled to a normal level and only increase it when the filling hopper is running empty, i.e. at the end of the processing process, and thereby ensure that the filling level of the chambers in the conveyor mechanism continues to be sufficient.

SUMMARY

There is therefore a demand for filling and portioning systems and methods for adjusting the rotational speed of associated feeder/mixing arms and/or counterholding devices that are improved with regard to at least one of the objects mentioned.

The object stated is satisfied by a filling and portioning system and a method for rotational speed control of a feeder/mixing arm and/or counterholding device.

The filling and portioning system is therefore used to process pasty or substantially liquid food products, also referred to hereafter as filling materials, such as raw sausage, dough, soup or the like.

For this purpose, the filling machine comprises: a filling hopper for receiving such a food product and/or components thereof; a feeder/or mixing arm rotatable about itself in the filling hopper by way of a first motor for moving/conveying the food product/components in the filling hopper; a conveyor mechanism downstream thereof which is driven independently of the feeder/mixing arm by way of a second motor and operates in particular with vacuum assistance; and a counterholding device which is stationary in the filling hopper or which can be rotated about itself by way of a third motor to enhance the conveying effect upon the food product/components in the direction of the conveyor mechanism.

According to the disclosure, the filling and portioning system comprises an electronic/programmed control device for automated rotational speed control of the first motor and/or the third motor, each independently of the second motor and in dependence respectively of at least one machine parameter of the filling and portioning system measured during operation of the filling and portioning system and/or of respectively measured product parameters of the processed food product or a component thereof.

The at least one machine parameter and/or product parameter can be measured, for example, in the region of the filling hopper, the conveyor mechanism, and/or therebetween, i.e. at a vacuum filling machine comprising these components. However, the measurement described is also possible at a filling grinder integrated therein and/or an attachment device of the filling machine, such as at a sausage line, a shaping system, a metering system or the like. The measurement described is also possible at a loading system for the food product and/or components thereof integrated into the filling and portioning system and/or at a weighing system on the outlet side for monitoring the weight of the portioned food product.

The machine or product parameter measured is to be understood to be an actual value by way of which the control device of the filling and portioning system can decide independently whether the rotational speed of the motor that is respectively set should continue to be maintained or whether it should be increased/reduced. The respective actual value can then be compared with an associated, for example, product-specific target value or target value range and adjusted thereto during ongoing production operations.

The rotational speed control adjusts the rotational operating speed of the respective motor in an automated manner in dependence of the (at least one) machine parameter and/or product parameter detected by sensors for this purpose and possibly corrects the rotational operating speed during ongoing operations. This pertains to the rotational operating speed for continuous rotation and/or for rotation in intermittent operation (pulse-pause operation, clocked operation) of the feeder/mixing arm and/or the counterholding device. The rotational speed control according to the disclosure therefore goes beyond simply switching on/off the respective motor a well as maintaining a rotational speed specified by the operator.

As a result, the rotational speed and therefore the operating speed of the feeder/mixing arm and the rotational speed of the counterholding device can be continuously adapted to the current production conditions in the region of the filling and portioning system, thereby maintaining the required product quality and obtaining quantitatively reliable filling and portioning.

The feeder/mixing arm can have an auger/helical shape in a known manner for kneading food products or their components into a pasty form by rotation and to mechanically assist their being fed to the conveyor mechanism. This is typically referred to as a feeder arm and/or a feeder arm operation. Likewise, the feeder/mixing arm can comprise mixing arms with vanes/paddles for mixing substantially liquid food products and/or to counteract separation of chunky components contained. This is typically referred to as a mixing arm and/or a mixing arm operation. However, the feeder/mixing arm can also be configured for both and/or combined operating modes.

The counterholding device in the form of a counter arm or auger can have an auger/helical shape in a known manner for kneading food products or their components into a pasty form through standstill or rotation in interaction with the feeder arm and to mechanically assist their being fed to the conveyor mechanism. This is commonly referred to as a counterholding arm.

The filling and portioning system comprises, for example, at least one sensor connected to the control device for measuring the machine parameter or product parameter. The sensor is then configured, for example, as a pressure sensor/vacuum sensor for measuring a pressure/vacuum prevailing in the region of the conveyor mechanism and/or as a filling level sensor for measuring a filling level in the filling hopper and/or as an outlet pressure sensor for measuring an ejection pressure at the conveyor mechanism on the outlet side and/or as a compression pressure sensor for measuring a compression pressure acting upon the food product in the conveyor mechanism and/or as a feed pressure sensor for measuring a feed pressure at the conveyor mechanism and/or as a component of a weighing system for measuring the weight of the portioned food product on the outlet side.

Such a control device interacting with such sensors can, for example, counteract a vortex effect during the mixing arm operation when the filling hopper is emptying, in order to prevent the chambers in the conveyor mechanism from being filled incompletely. Likewise, a vacuum drop due to insufficiently compressed food product/filling material at the outlet of the filling hopper/at the inlet of the conveyor mechanism can be counteracted, thereby preventing the chambers in the conveyor mechanism from being filled incompletely. It is also possible to prevent the food product/filling material in the filling hopper from being overstressed by the motion of the feeder/mixing arm, in order to thus prevent, for example, raw sausage from smearing or undesired degassing of dough. Likewise, insufficient rotational speed adjustment of the feeder/mixing arm or counterholding device to a fluctuating consistency of the food product/filling material can be counteracted.

For example, the actual rotational speed of the first and/or third motor can be continuously adjusted during operation to a target rotational speed which can change dynamically if necessary due to the production circumstances mentioned hereafter. For example, the target rotational speed can depend on the viscosity of the food product/filling material, on its filling level in the filling hopper, on its sensitivity to mechanical stress, on the extent to which the chamber is filled in the conveyor mechanism, and/or on the product compression in the inflow to the conveyor mechanism and the associated vacuum build-up in the region of the conveyor mechanism. Process conditions that have changed in this manner can be detected, for example, by a filling level sensor in the region of the filling hopper and/or by a vacuum sensor in the region of the conveyor mechanism. The extent to which the chamber is filled in the conveyor mechanism can be determined, for example, on the basis of pressure measurements on the outlet side in the region of the conveyor mechanism, possibly taking into account associated characteristic curves.

The control device may be configured to increase the rotational speed in an automated manner when the vacuum in the filling hopper, the conveyor mechanism, and/or between them drops below a minimum level and/or when the filling hopper runs empty. This is to prevent the individual chambers of the conveyor mechanism from being insufficiently filled and/or the vacuum in the region of the conveyor mechanism from dropping below the required level.

In some embodiments, the control device is also configured for automated rotation clocking of the motor in the sense of a rotation operation pause control/an interval operation in dependence of at least one machine or product parameter measured during operation of the filling and portioning system. This primarily ensues consistently adequate mixing of liquid food products/filling material, for example, in the production of soups or the like. The operation of the mixing arm and the counterholding device can thereby be flexibly adapted to different product properties, such as the viscosity and/or mechanical strength of the food product.

A rotation operation pause control is to be understood to mean a clocked operation of the motor in which the latter is repeatedly rotated and stopped at intervals. Rotation speed control and rotation clocking/rotation operation pause control can also be combined with each other.

The embodiments described above of the rotational speed control and sensory detection of the machine and/or product parameters can in principle be configured for the first and/or third motor or used accordingly. The electronic control device is suitably programmed for this purpose in a manner that is known in principle.

In an embodiment, the conveyor mechanism is a vacuum-assisted vane conveyor mechanism. This allows the food product/filling material to be suctioned in, compressed in the conveyor mechanism, degassed if necessary, and made available with a suitable ejection pressure for further processing, for example, in a filling grinder. The conveyor mechanism can also be configured as an auger conveyor mechanism, a gear pump or a piston pump.

As is known, the counterholding arm can be configured substantially as a helix tapering in diameter downwardly. For this purpose, the counterholding arm can also be configured as a so-called counterholding auger, for example, for compacting crumbly filling material and/or for processing particularly tough doughs.

The control device can also be set up/programmed to control the rotational speed of the second motor in dependence of at least one machine and/or product parameter, which is then in particular a sensor-monitored inflow of the food product to the conveyor mechanism. As a result, the second rotational speed and therefore the conveying capacity of the conveyor mechanism can be reduced if a predetermined minimum inflow of the food product to be filled to the conveyor mechanism is no longer sufficiently ensured/is undercut. For this purpose, for example, a sensor can be arranged at the product inlet of the conveyor mechanism/in the associated feed funnel.

The filling hopper, the feeder/mixing arm, the conveyor mechanism, and the control device are, for example, components of a vacuum filling machine for pasty and/or liquid food products/filling material. The filling and portioning system can consist of such a vacuum filling machine or comprises it as a central component in terms of control technology.

The control device described is configured to carry out the method steps respectively described with regard to rotational speed control and/or vacuum control, i.e. to electronically process actual values of the machine/product parameters continuously, to compare them with associated target values/target value ranges and, on this basis, to actuate electronically at least the motor of the feeder arm/mixing arm and/or the counterholding device. Corresponding actuation of the motor of the conveyor mechanism and/or the associated vacuum pump is also conceivable.

The method described is used to control the rotational speed of a feeder/mixing arm and/or the counterholding device in a filling and portioning system for food products. According thereto, a food product/filling material or components thereof is/are filled into a filling hopper, moved therein by the feeder and/or mixing arm that is rotated about itself by way of a motor, and fed from there to a conveyor mechanism. The conveyor mechanism is driven independently of the feeder/mixing arm and independently of the counterholding device.

According to the disclosure, at least one machine and/or product parameter is measured at the filling and portioning system during its operation and the rotational speed of the motor is then controlled in an automated manner in dependence thereof.

For example, the machine and/or product parameter is measured in that a vacuum prevailing in the region of the conveyor mechanism and/or a filling level in the filling hopper and/or a pressure on the outlet side at the conveyor mechanism and/or a compression pressure in the conveyor mechanism and/or a feed pressure at the conveyor mechanism and/or or a weight of the portioned food products is monitored by sensors.

The rotational speed may be controlled in dependence of a vacuum in the conveyor mechanism, in particular in that the rotational speed is increased when it drops below an associated minimum vacuum and/or is top-limited or reduced when an associated target vacuum has been reached. On the one hand, this enables the required product quality to be obtained and, on the other hand, the chamber to be sufficiently filled with product in the conveyor mechanism.

In a further embodiment, the rotational speed is controlled in dependence of an actual filling level in the filling hopper, in particular in that the rotational speed is increased when the actual filling level is less than 20% of a nominal level filling associated with the capacity of the filling hopper, and/or in that the rotational speed is top-limited or reduced when the actual filling level is more than 80% of the nominal filling level. This counteracts mechanical overloading of the food product/filling material and/or ejection from the filling hopper at a comparatively high filling level, as well as insufficient vacuum build-up at/in the conveyor mechanism and therefore insufficient filling of the chamber in the conveyor mechanism.

In a further embodiment, the rotational speed is controlled in dependence of a feed pressure measured at the inlet to the conveyor mechanism and/or an ejection pressure measured at the outlet of the conveyor mechanism, in particular in that the rotational speed is increased when the pressure drops below an associated minimum and/or is top-limited or reduced when an associated target pressure has been reached. This also makes it possible to fill the chamber in the conveyor mechanism as completely as possible and in a manner adapted to the consistency and/or mechanical load capacity of the food product/filling material.

In a further embodiment, the rotational speed is controlled in dependence of an actual weight and/or an actual portion size of the portioned food product/filling material, in particular on the basis of a density of the food product/filling material calculated therefrom. For example, a density that is too low can be counteracted by increasing the rotational speed in a suitable manner and vice versa. Filling the chamber in the conveyor mechanism is selectively assisted by appropriate rotational speed adjustment.

In a further embodiment, a vacuum prevailing in the region of the conveyor mechanism is controlled in dependence of a feed pressure and/or a compression pressure and/or an ejection pressure prevailing at/in the conveyor mechanism, in particular in that the vacuum is increased when an associated pressure drops below a minimum and/or is top-limited or weakened when an associated target pressure has been reached. This makes it possible, for example, to prevent certain food products/filling materials, such as dough or the like, from drying out or degassing excessively, in that the vacuum prevailing in the conveyor mechanism is optimized. The control device is then configured for corresponding vacuum control.

In the method described, the food product is mixed and/or conveyed by clocked and/or continuous rotation of the feeder/mixing arm and/or the counterholding device and is accordingly fed to the conveyor mechanism in pasty or liquid form. In the case of pasty food products/filling materials, a feeder arm which is configured substantially in the shape of an auger or a helix with a diameter that tapers downwardly can be used. In the case of a liquid food product/filling material, a mixing arm may be used which comprises, for example, several vanes/paddles revolving in the filling hopper.

BRIEF DESCRIPTION OF THE FIGURES

An embodiment of the disclosure is illustrated by a drawing. The single FIGURE shows a schematic side view of a filling and portioning system for food products which are substantially pasty or liquid filling materials that can also have chunky components.

DETAILED DESCRIPTION

Filling and portioning system 100 comprises as a central component a vacuum filling machine 1 with a filling hopper 2 for receiving a food product 3 and/or components thereof and with a feeder and/or mixing arm 4 that is rotatable about itself in filling hopper 2 and that is driven, for example, by a first motor 5 formed as a servo motor. Feeder and/or mixing arm 4 therefore rotates about central axis 2a of filling hopper 2 when first motor 5 is in operation.

Filling and portioning system 100 also comprises as a component of vacuum filling machine 1 a conveyor mechanism 6 which is positioned downstream of filling hopper 2 and can be configured as a vacuum-assisted vane cell conveyor mechanism. Conveyor mechanism 6 then comprises revolving chambers 6a/vane cells in which food product 3 is conveyed and thereby compressed in a manner that is known in principle. Conveyor mechanism 6 is driven independently of feeder/mixing arm 4 by way of a second motor 7 which is configured, for example, as a servomotor.

Filling and portioning system 100 also comprises as a component of vacuum filling machine 1 an electronic control device 8 for automated/programmed rotational speed control of first motor 5 in dependence of at least one machine parameter MP and/or product parameter PP measured in the region of filling and portioning system 100 during operation.

Also shown schematically is a vacuum pump 9 for generating a vacuum VK in the region of conveyor mechanism 6. Food product 3/filling material is suctioned into the region of conveyor mechanism 6 with vacuum VK and feeding food product 3 is there assisted, if necessary, by feeder/mixing arm 4 and/or a counterholding device 10 interacting therewith. This applies in particular to pasty food products 3. For liquid food products 3, in particular those where chunky components tend to separate, feeder/mixing arm 4 can comprise mixing vanes/paddles in a manner that is not shown but is known in principle and which then revolve in a suitable manner driven in filling hopper 2 by first motor 5 driven.

In the example shown, substantially auger-shaped and/or helical feeder/mixing arm 4 comprises a scraper 4a that runs along the inner wall of filling hopper 2 and pushes pasty food product 3 ahead of it or scrapes it off the filling hopper wall.

Feeder/mixing arm 4 interacts with a counterholding device 10 which is arranged in filling hopper 2 in a rotationally fixed manner or can rotate about itself and which also has a substantially auger shape and/or a helical shape. Feeder/mixing arm 4 and counterholding arm 10 can have features that are known in principle and are therefore not described in detail.

In the rotatable embodiment, counterholding device 10 is driven by a third motor 20 embodied, for example, as a servomotor. As indicated by way of example, the latter can be arranged in the upper region of filling hopper 2. Counterholding device 10 then may likewise rotate about central axis 2a of filling hopper 2 when third motor 20 is in operation.

With appropriately programmed control device 8, for example one having memory including instructions for carrying out the operations described herein, including where at least rotational operating speed DZ1 of first motor 5 or, possibly, at least rotational operating speed DZ3 of third motor 20 can be set/changed in an automated manner, i.e. without operator intervention, on the basis of machine parameters MP and/or product parameters PP detected by sensors. Optionally, this is also given for rotational operating speed DZ2 of second motor 7, i.e. for the conveying capacity of conveyor mechanism 6.

The rotational speed control according to the disclosure enables a more flexible application of feeder/mixing arms 4 also for different production processes and/or properties of food product 3 respectively to be processed. In other words, the rotational speed control described reduces the need for feeder/mixing arms 4 to be specially adapted to certain processes and/or food products 3 and thereby the equipment complexity and the need for change-overs.

Filling and portioning system 100 furthermore comprises at least one sensor 11-15 connected to control apparatus 8 for measuring machine parameter MP or product parameter PP.

In the example shown, a first sensor 11 is a filling level sensor for monitoring filling level FS of food product 3/filling material to be processed in filling hopper 2, i.e. for measuring such a machine parameter MP.

A second sensor 12 is, for example, a pressure sensor which could be configured to monitor a vacuum prevailing in the region of conveyor mechanism 6 or the feed pressure prevailing at the inlet of conveyor mechanism 6, i.e. also for measuring a corresponding machine parameter MP.

Second sensor 12 could additionally or as an alternative be configured for product monitoring, for example, monitoring the flow and/or the presence of food product 3/filling material at the inlet to conveyor mechanism 6 (not shown). This would also be a suitable machine parameter MP, on the basis of which, for example, rotational operating speed DZ2 of second motor 7, i.e. the conveying capacity of conveyor mechanism 6, could be controlled in the sense as described.

A third sensor 13 shown by way of example is an outlet pressure sensor for monitoring a pressure at conveyor mechanism 6 at the outlet side, i.e. for measuring such a machine parameter MP. As an alternative, this sensor can also be arranged in conveyor mechanism 6 to measure the compression pressure.

A fourth sensor 14 shown by way of example is a continuous scale as part of a weighing system 16 for monitoring the weight of the portioned food product 3 on the outlet side, i.e. for measuring such a product parameter PP.

A fifth sensor 15 shown by way of example is a flow measuring device or filling level sensor of a loading system 17 for food product 3/filling material which could be made available in this manner in particular in liquid form. A machine parameter MP of filling and portioning system 100 is therefore again measured with fifth sensor 15.

For example, current filling level FS of food product 3/filling material in filling hopper 2 can be measured directly with first sensor 11 and/or with fifth sensor 15 as a machine parameter MP or possibly calculated therefrom. The actual value of filling level FS determined in this manner is used by control device 8 to adapt rotational operating speed DZ1 of first motor 5 or feeder/mixing arm 4, respectively, in an automated manner to the current actual value of filling level FS. For example, rotational operating speed DZ1 is set in an automated manner to be lower when filling level FS1 is relatively high than when filling level FS2 is relatively low, as occurs, for example, when filling hopper 2 runs empty.

As an alternative or additionally, a pressure respectively measured in the region of conveyor mechanism 6, for example, with second and/or third sensor 12, 13, could be used to optimize rotational operating speed DZ1 in an automated manner in order to ensure product-friendly filling/portioning of food product 3/filling material and to obtain consistently sufficient filling of individual chambers 6a. If, for example, a vacuum VK, on which the rotational speed control is based, is weaker than an associated minimum value, then rotational operating speed DZ1 can be increased in an automated manner by control device 8 in order to nevertheless reliably obtain complete filling of chambers 6a of conveyor mechanism 6.

As an alternative or in addition, third sensor 13 could be used to verify whether sufficient ejection pressure is present for further processing of food product 3/filling material or whether the ejection pressure is possibly too high for processed food product 3/filling material, which could cause excessive outgassing from food product 3/filling material.

Similar measurements would be possible in the region of chambers 6a/vane cells for determining a degree of compression of food product 3/filling material. In both cases, control device 8 could keep the actual value of machine parameter MP (ejection pressure, compression pressure) monitored in this manner within a predetermined target value range by adjusting the rotational speed of first motor 5 in an automated manner.

In addition or as an alternative, control device 8 could determine the density of portioned food product 3/filling material in that a filling volume/portion volume specified by filling and portioning system 100 is offset from a portion weight individually measured by fourth sensor 14. If, for example, a density has been calculated to be too low, which would ultimately result in a portion weight that is too low, then the degree of compression of food product 3/filling material can be increased in an automated manner, possibly by increasing rotational operating speed DZ1 of first motor 5, since an increase in the rotational speed can improve the filling of the chamber and thereby can cause a desired compression of food product 3/filling material.

In principle, control device 8 can set/adapt rotational operating speed DZ3 of third motor 20 in an automated manner in the same way as described above. Depending on machine/product parameters MP. PP used, this is possible both in addition to the rotational speed control of first motor 5 and as an alternative thereto.

In principle, the rotational speed control of first and/or third motor 5, 20 can be based on the same machine/product parameters MP, PP, but also on different ones.

In addition, vacuum pump 9 can be controlled in an automated manner in dependence of a feed pressure measured by second sensor 12, for example, in the region of a feed funnel 18 arranged between filling hopper 2 and conveyor mechanism 6, and/or in dependence of a compression pressure in conveyor mechanism 6 and/or an ejection pressure at conveyor mechanism 6. In principle, this vacuum control can also be effected in control device 8 in dependence of at least one machine parameter MP or product parameter PP measured in the region of filling and portioning system 100 in the manner described for the rotational speed control.

The association of sensors 11-15 described with individual machine/product parameters MP, PP and/or regions of filling and portioning system 100 is to be understood to be only by way of example. In principle, other associations are conceivable for rotational speed and/or vacuum control.

Filling and portioning system 100 can be employed, for example, as follows.

Depending on the recipe and the consistency of the ingredients, food product 3/filling material can be fed step by step from transport containers or the like to filling hopper 2 by way of an arm raising device (not shown) and/or from a connected loading system 17, which in principle also enables continuous refilling.

During the processing of food product 3/filling material in filling hopper 2, at least one of machine parameters MP and/or product parameters PP described is continuously monitored and rotational operating speed DZ1 of first motor 5 is adjusted thereto in an automated manner. This is described below for rotational speed control in dependence of filling level FS in filling hopper 2.

For this purpose, a product and/or process selection could initially be made at control device 8 in order to specify a suitable target value range for rotational operating speed DZ1.

Filling level FS in filling hopper 2 can then be measured either directly as a machine parameter MP by first sensor 11 at filling hopper 2 and/or indirectly from a machine parameter MP measured with fifth sensor 15, for example, a flow value at associated loading system 17. In both cases, control device 8 adjusts rotational operating speed DZ1 of first motor 5 in an automated manner in dependence of continuously monitored filling level FS within a respectively permitted rotational speed range. The rotational speed/stirring speed of feeder/mixing arm 4 driven by first motor 5 is then generally set to be faster when filling level FS1 is relatively high than when filling level FS2 is relatively low, in particular, when filling hopper 2 is running empty.

Food product 3/filling material is kept in motion by rotating feeder/mixing arm 4 and scraper 4a formed thereon then scrapes it off the inner wall of filling hopper 2. As soon as the inflow to conveyor mechanism 6 is open, feeder/mixing arm 4 assists the feeding of food product 3/filling material into conveyor mechanism 6, which is subjected to vacuum VK, in that, for example, the cross section of feed funnel 18 therebetween always remains completely filled with food product 3.

The shape of counterholding device 10 is such that food product 3 in filling hopper 2 does not co-rotate with feeder/mixing arm 4 (conveying arm), but that a conveying effect to conveyor mechanism 6 arises.

This effect can be intensified by a rotary drive of counterholding device 10. Rotational operating speed DZ3 of third motor 20 can then in principle be set/adapted by control device 8 in the manner described for first motor 5.

Food product 3 is suctioned in with the aid of vacuum VK generated in the region of conveyor mechanism 6 and filled through feed funnel 18 into individual chambers 6a/vane cells of conveyor mechanism 6. As chambers 6a/vane cells revolve in conveyor mechanism 6, food product 3 is compressed and a desired density of food product 3 is set, for example, subject to degassing.

Vacuum VK prevailing in the region of conveyor mechanism 6 can be monitored, for example, by second sensor 12 and transmitted as a machine parameter MP to control device 8. The latter can adapt rotational operating speed DZ1 of first motor 5 and thereby the stirring speed of feeder/mixing arm 4 and/or rotational operating speed DZ3 of third motor 20/counterholding device 10 in an automated manner within a specified rotational speed range, for example, taking into account filling level FS and vacuum VK prevailing in the region of conveyor mechanism 6.

Consequently, chambers 6a/the vane cells are always completely filled with food product 3 and its selective and reproducible compression is thus made possible. Food product 3 can therefore be portioned gently and produced having the required density. In a basically corresponding manner, rotational speed control is possible on the basis of a continuously monitored ejection pressure, feed pressure, and/or compression pressure in the region of conveyor mechanism 6.

After portioning in an attachment device 19 (shown only very schematically), portioned food product 3 is weighed in portions by fourth sensor 14, presently by a continuous scale of a weighing system 16, and product parameter PP measured in this manner, presently the individual portion weight, is transmitted to control device 8.

If, for example, the portion weight is too low and the density of food product 3 for a given portion volume is therefore too low, then rotational operating speed DZ1 of first motor 5 can be increased in an automated manner during ongoing production operation in order to possibly improve the filling of individual chambers 6a/vane cells and to thus bring about the compression of food product 3/filling material to a predetermined density.

In principle, the measurements described of individual machine parameters MP and product parameters PP during ongoing production operation can be combined with one another as desired and can be included in the rotational speed control and optional vacuum control described.

The invention claimed is:

1. A filling and portioning system for food products, comprising: a filling hopper for receiving a food product and/or components thereof; a feeder and/or mixing arm that is rotatable about said feeder and/or mixing arm in said filling hopper by way of a first motor for moving said food product/components in said filling hopper; a conveyor mechanism which is positioned downstream thereof and driven by a second motor; a counterholding device arranged in said filling hopper for assisting conveyance from a region of said feeder/mixing arm to said conveyor mechanism, and a control device controlling in an automated manner a rotational speed of said first motor and/or a third motor for rotationally driving said counterholding device, each independently of said second motor and in dependence of at least one machine or product parameter measured during operation of said filling and portioning system.

2. The filling and portioning system according to claim 1, further comprising at least one sensor connected to said control device for measuring said machine or product parameter.

3. The filling and portioning system according to claim 2, wherein the at least one sensor is in the form of a vacuum sensor for measuring a vacuum prevailing in the region of said conveyor mechanism and/or filling level sensor for measuring a filling level in said filling hopper and/or outlet pressure sensor for measuring a pressure at said conveyor mechanism on an outlet side and/or compression pressure sensor for measuring a compression pressure in said conveyor mechanism and/or feed pressure sensor for measuring a feed pressure at said conveyor mechanism and/or as part of a weighing system for measuring the weight of said portioned food product on the outlet side.

4. The filling and portioning system according to claim 2, where said control device is configured for automated rotational speed adjustment when the vacuum drops below a minimum in said filling hopper, said conveyor mechanism, and/or therebetween and/or when running empty.

5. The filling and portioning system according to claim 1, where said control device is furthermore configured for automated rotation operation pause control of at least said first motor in dependence of at least one machine or product parameter measured during operation of said filling and portioning system.

6. The filling and portioning system according to claim 1, where said conveyor mechanism is a vacuum-assisted vane cell conveyor mechanism.

7. The filling and portioning system according to claim 1, where said control device is configured to control the rotational operating speed of said second motor in dependence of at least one machine and/or product parameter.

8. The filling and portioning system according to claim 7, wherein the at least one machine and/or product parameter is a sensor-monitored inflow of said food product to said conveyor mechanism and thereby reduce it when a predetermined inflow drops below a minimum.

9. The filling and portioning system according to claim 1, where said filling hopper, said feeder/mixing arm, said counterholding device, said conveyor mechanism and said control device are components of a vacuum filling machine for pasty and/or or liquid food products.

10. A method for rotational speed control of a feeder/mixing arm and/or a counterholding device that interacts with said feeder/mixing arm in terms of conveying technology in a filling and portioning system for food products, where a food product or components thereof is/are filled into a filling hopper, moved therein by said feeder and/or mixing arm rotated about said feeder and/or mixing arm by way of a first motor against a resistance exerted by said counterholding device, and fed to a conveyor mechanism driven by a second motor, wherein at least one machine and/or product parameter is measured in the region of said filling and portioning system and, in dependence thereof, a rotational operating speed of said first motor and/or a third motor rotating said counterholding device is controlled in an automated manner.

11. The method according to claim 10, where said machine and/or product parameter is measured in that a vacuum prevailing in the region of said conveyor mechanism and/or a filling level in said filling hopper and/or a pressure at said conveyor mechanism on an outlet side and/or a compression pressure in said conveyor mechanism and/or a feed pressure at said conveyor mechanism and/or a weight of said portioned food product and/or a product inflow to said conveyor mechanism is monitored by sensors.

12. The method according to claim 1, where said rotational speed is controlled in dependence of a feed pressure measured continuously at the inlet to said conveyor mechanism and/or an ejection pressure measured continuously at the outlet of said conveyor mechanism.

13. The method according to claim 10, where said rotational operating speed is controlled in dependence of a continuously measured vacuum in said conveyor mechanism.

14. The method according to claim 13, wherein the rotational operating speed is increased when the vacuum drops below a minimum and/or is top-limited or reduced when a target vacuum has been reached.

15. The method according to claim 10, where said rotational operating speed is controlled in dependence of a continuously determined filling level in said filling hopper, wherein the rotational operating speed is increased when the determined filling level is less than 20% of a nominal filling level associated with the capacity, and/or the rotational operating speed is top-limited or reduced when the determined filling level is more than 80% of the nominal filling level.

16. The method according to claim 15, wherein the rotational operating speed is increased when the determined filling level is less than 20% of a nominal filling level associated with the capacity, and/or the rotational operating speed is top-limited or reduced when the determined filling level is more than 80% of the nominal filling level.

17. The method according to claim 10, where said rotational operating speed is controlled in dependence of an individually measured weight and/or an individually measured portion size of said food product.

18. The method according to claim 10, where a vacuum prevailing in the region of said conveyor mechanism is controlled in dependence of a feed pressure and/or a compression pressure and/or an ejection pressure prevailing at/in said conveyor mechanism.

19. The method according to claim 10, where said food product is mixed and/or conveyed by clocked and/or continuous rotation of said feeder/mixing arm and is accordingly fed to said conveyor mechanism in pasty or liquid form.

* * * * *